United States Patent [19]
Kidd et al.

[11] Patent Number: 5,410,617
[45] Date of Patent: Apr. 25, 1995

[54] METHOD FOR ADAPTIVELY THRESHOLDING GRAYSCALE IMAGE DATA

[75] Inventors: Robert C. Kidd, Ann Arbor; Robert D. Klein, Farmington, both of Mich.

[73] Assignee: Unisys Corporation, Blue Bell, Pa.

[21] Appl. No.: 150,586

[22] Filed: Nov. 10, 1993

Related U.S. Application Data

[63] Continuation of Ser. No. 796,632, Nov. 21, 1991, abandoned, which is a continuation-in-part of Ser. No. 691,505, Apr. 25, 1991, abandoned.

[51] Int. Cl.⁶ .............................................. G06K 9/38
[52] U.S. Cl. ...................................... 382/51; 358/466; 382/54
[58] Field of Search .................. 382/51, 18, 6, 50, 54; 358/465, 466, 455

[56] References Cited

U.S. PATENT DOCUMENTS

| | | | |
|---|---|---|---|
| 4,754,332 | 6/1988 | Bergquist | 382/27 |
| 4,964,066 | 10/1990 | Yamane et al. | 382/65 |
| 5,065,444 | 11/1991 | Garber | 382/51 |
| 5,065,447 | 11/1991 | Barnsley et al. | 382/27 |
| 5,123,060 | 6/1992 | Cho et al. | 382/51 |
| 5,150,421 | 9/1992 | Morishita et al. | 382/51 |
| 5,157,740 | 10/1992 | Kelin et al. | 382/51 |
| 5,289,374 | 2/1994 | Doi et al. | 382/6 |

FOREIGN PATENT DOCUMENTS

| | | |
|---|---|---|
| 0096220 | 2/1983 | European Pat. Off. |
| 61-0072223 | 3/1986 | Japan . |
| 63-0040873 | 2/1988 | Japan . |

*Primary Examiner*—Joseph Mancuso
*Attorney, Agent, or Firm*—Harness, Dickey & Pierce

[57] ABSTRACT

A method of generating a remapping function for use in converting near-photographic document image pixel gray level data lying in a first range of gray level values to higher contrast, background-suppressed pixel gray level data lying in a second more limited gray level range. Global document information, such as a histogram of all the document's original pixels, is used to generate at least one threshold gray level value and to determine the shape of the remapping function on either side of the threshold. Preferably, the remapping function is implemented by a look-up table addressed in accordance with the original pixel data.

18 Claims, 6 Drawing Sheets

METHOD FOR ADAPTIVELY THRESHOLDING GRAYSCALE IMAGE DATA

This is a continuation of U.S. patent application Ser. No. 07/796,632, filed Nov. 21, 1991, now abandoned, which is a continuation-in-part of U.S. Ser. No. 07/691,505, filed Apr. 25, 1991, now abandoned, and assigned to the same assignee.

BACKGROUND OF THE INVENTION

The invention concerns image data processing. More particularly, the invention pertains to high speed, post-processing of image data to adaptively effect gray level tone scale adjustment of document imagery at an image-based data entry work station. Still more specifically, the invention is directed to a method of generating a pixel remapping formation to effect the gray level adjustment.

Financial documents, such as checks or drafts, usually contain a magnetic ink character recognition (MICR) code line which is typically read by a sorter and which automatically sorts these documents into a plurality of bins. Prior to sorting, in current practice, these documents are presented to banking personnel who physically handle the documents and mechanically enter, in MICR form, the dollar amount associated therewith upon each document by the use of specialized amount entry equipment. Additionally, these individuals physically correct incorrectly read MICR data associated with each of the sorted documents.

These prior techniques of utilizing banking personnel to process financial documents have proven relatively costly and inefficient, in that many of these documents have been lost or destroyed during their physical handling, and the speed associated with the processing of the documents is limited to that associated with the processing capabilities of the banking personnel and the mechanical amount entry equipment they use.

To address these problems, document imaging systems have been introduced to eliminate much of the previously required physical handling of the documents themselves. In such known systems, functions such as image data element normalization, background suppression, scaling and document height detection are performed as preprocessing functions prior to compression of the document image data for storage or transmission to a data decompressor.

Previous approaches for effecting background suppression in document image processing systems to yield higher contrast images for data entry operators are complex. Additionally, for imaging systems to be associated with archival storage systems, the original image data cannot be discarded in a suppression technique, but must be maintained for archival integrity. Therefore, there is a need for an efficient, relatively non-complex approach to gray level tone scale adjustment, such as thresholding image pixel data, in order to yield picture-like representations of the image at the workstation which feature increased contrast of written and printed text for viewing by a data entry operator. Such gray level tone scale adjustment also finds use in printing and facsimile transmission applications.

SUMMARY OF THE INVENTION

Accordingly, a method of generating a gray level contrast enhancing and adjustment function for use in adaptively thresholding original gray level document image data includes the steps of generating a gray level histogram of the original gray scale image data, identifying at least one peak in a preselected gray level range in the histogram, and defining the adjustment function as a) adjusting all original gray level datum points to a whitest gray scale level whenever a datum point level is whiter than a threshold level determined by the at least one histogram peak, and b) adjusting all other original gray level datum points having gray levels less than the threshold level to preselected levels darker than the whitest level.

BRIEF DESCRIPTION OF THE DRAWINGS

The invention is best understood from a reading of a detailed description of an exemplary embodiment taken in conjunction with the drawings, in which.

DETAILED DESCRIPTION

Figure 1:
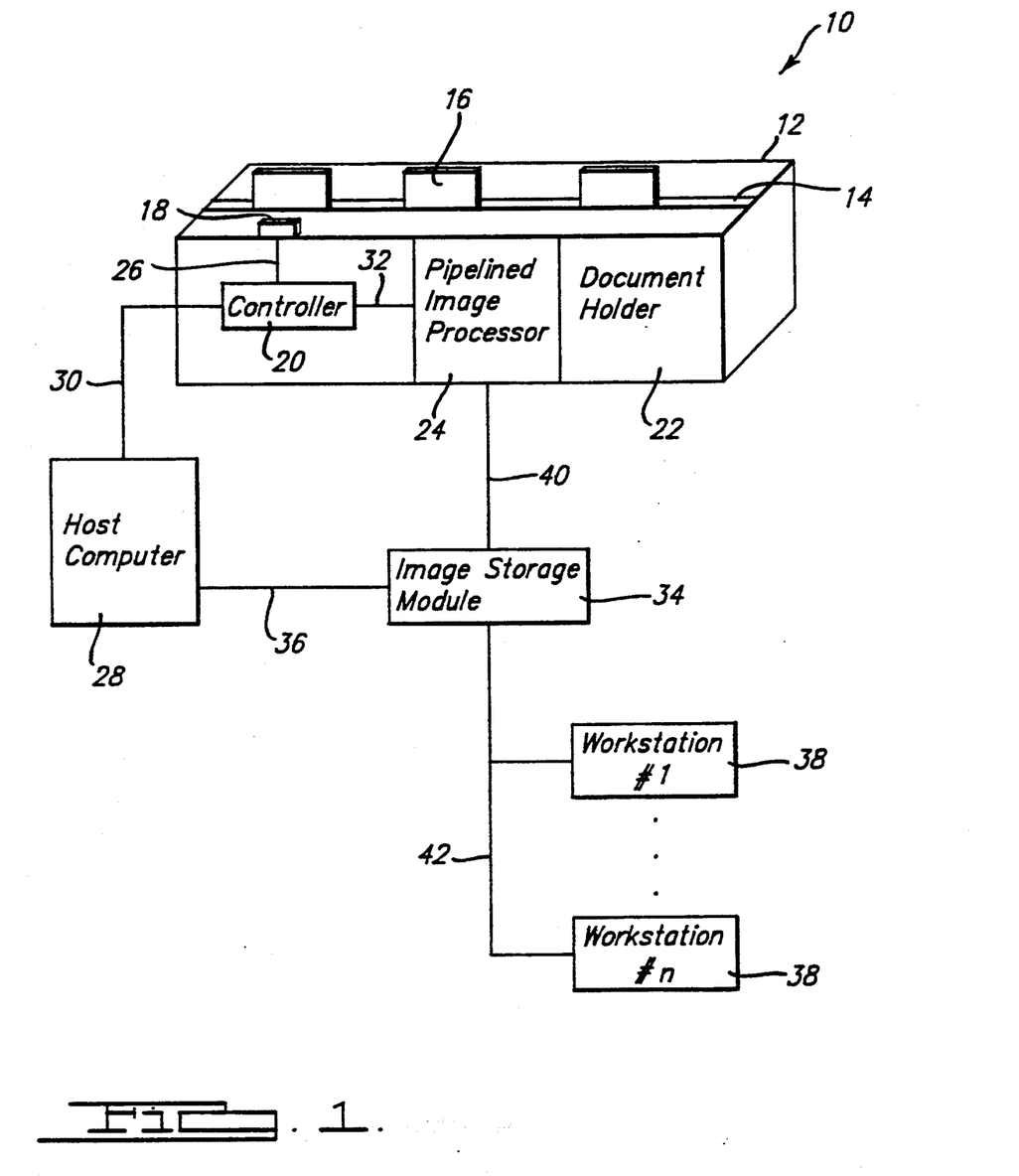
FIG. 1 is a functional block diagram of a document sorting system utilizing a preferred embodiment of the method for adaptively adjusting grayscale image data.

FIG. 1 sets forth a financial document processing system 10 having a document sorter 12, which in the preferred embodiment of this invention comprises a model DP1800 sorter which is manufactured by the UNISYS CORPORATION of Bluebell, Pa.

Sorter 12 includes a track 14 through which a plurality of financial documents 16 traverse. Sorter 12 further contains a magnetic character reader 18 and magnetic strip character controller 20. Additionally, sorter 12 contains a document holder 22 and an image processor 24.

Controller 20 is coupled to reader 18 by signals on bus 26, to a host computer 28 by signals on bus 30, and to image processor 24 by signals on bus 32. Computer 28 is coupled to an image storage module 34 by signals on bus 36 and image storage module 34 is also coupled to image processor 24 and to a plurality of work stations 38 by signals on buses 40 and 42, respectively. It is contemplated that image storage module 34 could include a document image archival system.

In operation, documents 16 sequentially pass by reader 18 which reads a code appearing upon a MICR code line strip placed upon each of the documents 16. This code is then sent to computer 28 by signals on bus 30 for storage therein and to image processor 24 by signals on bus 32. As each of the documents 16 further travel along track 14, they pass in close proximity to processor 24 which creates an image thereof and sends this processed electronic image, by signals on bus 40, to image storage module 34 for storage therein. After passing by processor 24, each of the documents 16 are then sorted by sorter 12 in a conventional manner based upon the contents of the MICR code line. The documents are then held within document holder 22.

After a typical block of documents 16 has been sorted in the aforementioned manner, work stations 38, by signals on bus 42, may sequentially request the aforementioned document images from storage module 34. These electronic images are then downloaded to the work stations 38 by use of signals on bus 42 along with their associated magnetic code data obtained from host computer 28.

After the electronic images are decompressed, processed and displayed by workstation 38, workstation operators electronically enter information associated with each document (such as the so-called "courtesy amount" contained in a space on a typical bank check) and electronically resolve any difficulties associated with the reading of the MICR code. Each document image's MICR information and associated corrections then form a single record which is sent to storage module 34 by signals on bus 42. This information may then be later accessed for use in automatically placing MICR information on the sorted documents. Therefore, the document processing system 10 substantially eliminates the physical handling of the plurality of documents 16 when the associated MICR information is placed thereon, increasing the efficiency and speed of the overall document processing system 10.

Figure 2:
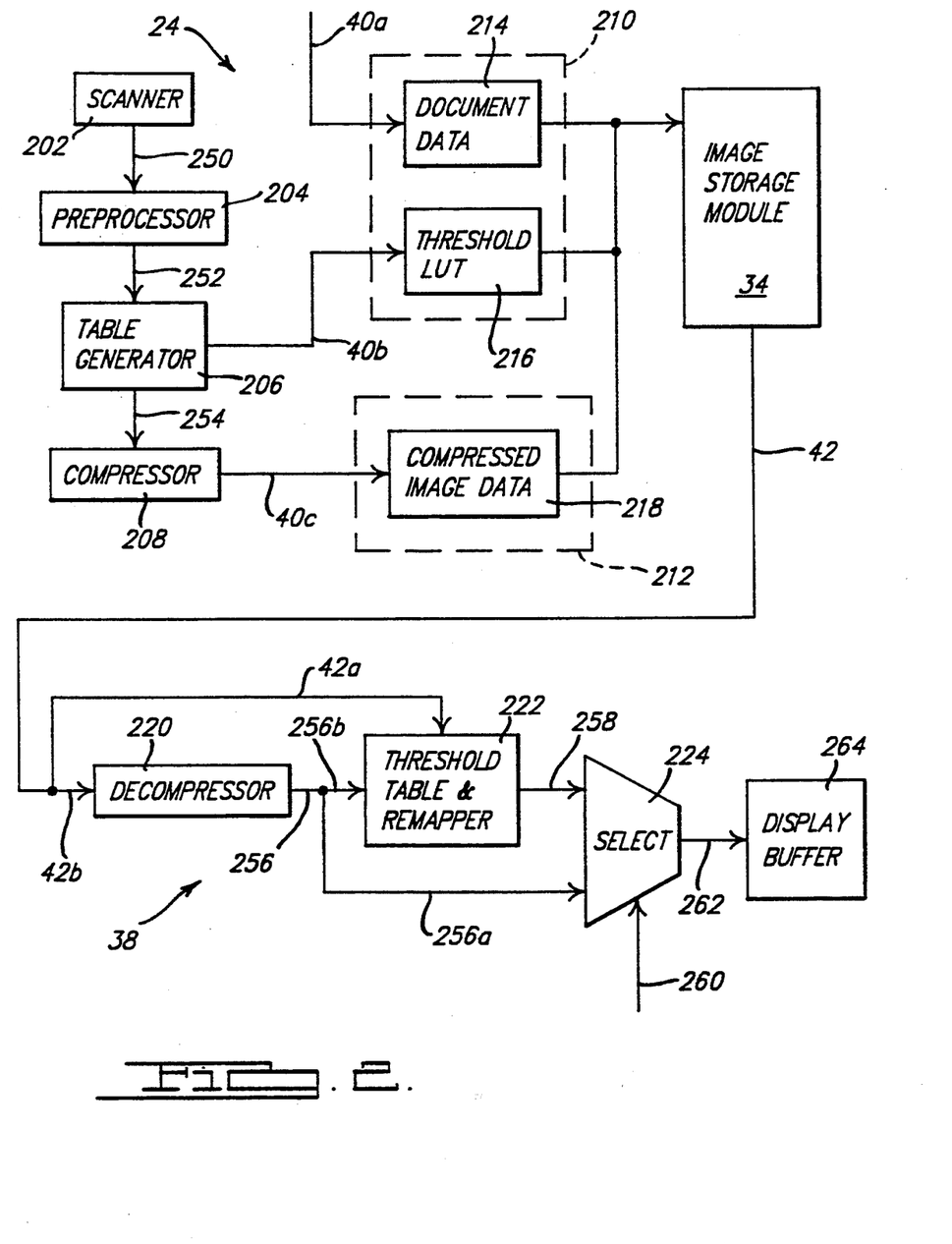
FIG. 2 is a functional block diagram setting forth portions of an image processor, storage module and workstation arranged for use with the invention.

FIG. 2 sets forth further details of image processor 24 and workstation 38 of FIG. 1 pertinent to use of the method of the invention. As seen from FIG. 2, image processor 24 includes a document scanner 202 coupled via bus 250 to a preprocessor unit 204. Preprocessor 204 is coupled via bus 252 to a look-up table (LUT) generator 206 which is coupled via bus 254 to an image data compressor unit 208 and via bus 40b to a file formation unit to be discussed below. Compressor 208 is coupled via bus 40c to a document image file organizer.

The document image file organizer of image processor 24 arranges each document image file entry as an image file header block 210 and an associated image file image data block 212. Image file header block 210 includes a document data portion 214 which receives additional document data from other portions of image processor 24 (not shown) via bus 40a. Header block 210 additionally includes a look-up table 216 whose contents have been generated by table generator 206 in accordance with the method of the invention to be described in more detail in a later portion of the detailed description. The file image data block contains compressed image data 218 which has been generated by compressor 208.

Look-up table 216 is utilized to represent an image data adjusting function for effecting one of a number of possible gray level tone scale adjustments. In the embodiment shown, pixel gray level thresholding for elimination of non-critical background image data is the adjustment being performed by table 216. However, it will become apparent to those skilled in the image processing art that the adjusting function could involve other tone scale adjusting functions, such as contrast reduction and gray level stretching. Indeed, depending upon the specific application, more than one adjusting or converting table could be generated at this point for association with compressed image data 218 of each document being processed.

Each document image file consisting of a header block 210 and a data block 212 has its contents stored in image storage module 34 via bus 40.

Document image files may be downloaded via bus 42 to one of a plurality of work stations 38. At workstation 38, the look-up table portion of the image file header block is coupled via bus 42a to threshold table and remapper unit 222, while the compressed image data block downloaded from image storage system 34 is coupled via bus 42b to an input of decompressor unit 220.

Output 256 of decompressor 220 carries the original decompressed picture elements, or digital "pixels", of the document image which are coupled via bus 256b to an input of threshold table and remapper unit 222 and via bus 256a to a first input to selector unit 224. The output of threshold table and remapper 222 carries thresholded pixels of the document image and presents them via bus 258 to a second input of selector unit 224. A control input 260 to selector unit 224 carries selection signals generated by a workstation operator for determining which of the first and second inputs will be transferred to output 262 of selector unit 224 for transmission to display buffer unit 264. It is to be understood that the adjusted gray scale data in buffer 264 could be utilized for other applications, such as printing or facsimile transmission.

Scanner unit 202 of image processor 24 optically scans each document 16 (FIG. 1) via, for example, a charge coupled photodiode array which senses, via a lens system, each document 16 which has been illuminated by a lamp arrangement. In one approach, the charged coupled photodiode array captures the image of a vertical strip associated with each document 16. As the document 16 passes by scanner unit 202, a plurality of these vertical strips of image data are generated and passed to image digitizers for forming a multi-bit pixel element corresponding to one portion of each vertical strip. Hence, each vertical strip is made up of plurality of digitized pixels.

A document's image pixels are then sent via bus 250 to preprocessor unit 204 wherein the pixel data are "massaged" in order to provide for more efficient data compression which is about to take place in another portion of image processor 24. Typical preprocessing operations performed at preprocessor unit 204 include height detection, normalization and image scaling. In prior imaging systems, an additional preprocessing function would be background suppression wherein non-essential visual elements of each document would be discarded prior to image compression. For example, many bank checks have scenic background areas imprinted upon the checks. This background detail is, of course, not needed by data entry operators who will be performing further work on an image of the document. However, in one use of the instant invention, the background suppression function is deferred until the document image has been downloaded for viewing or printing at a workstation associated with the image processing system. In this manner, the compressed image data held in an archival data store represents the original document including any "non-informational" background image information. This type of image data array is sometimes referred to as "near photographic".

Normalization at the preprocessor 204 refers to correcting data defects associated with such things as non-uniform photocell responsiveness of the image capture camera or non-uniform document illumination across a segment of the document being scanned.

The image scaling function allows images to be scaled relative to the resolution of the image in accordance with any one of a number of known methods.

After the preprocessing functions are performed in unit 204, the preprocessed document image pixels are sent via bus 252 to table generator 206. Table generator 206 examines preselected characteristics of the document image pixel data and forms the approximate equivalent of a, preferably, non-linear remapping curve or function via entries in a look-up table. The purpose of the remapping curve, in this embodiment, is to threshold the original gray level image pixel data into a picture representation yielding increased contrast of written and printed text to be viewed by a data entry operator at an image-based document work station. This table generation could be taking place simultaneously with image data compression in compressor 208, depending upon the specifics of the image processor 24. In any event, the LUT contents are computed in real time at image processor 24 on a per-document basis in accordance with the method of the invention.

The LUT contents generated and placed in portion 216 of image file header block 210 for the document of interest is used later at a workstation to threshold original pixels such that document background will be removed, or at least muted, and such that printed and written text is enhanced (i.e. darkened). Preferably, to conserve display memory at the work station, the thresholded pixels may have fewer gray levels than the original image pixels presented to the LUT for modification in accordance with the approximated remapping curve represented by the table contents.

Compressor 208 can use any of a large number of well known compression schemes. In a preferred embodiment, compression is effected using a Discrete Cosine Transform (DCT) procedure as outlined by the Joint Photographic Experts Group of the International Standards Organization (ISO/JPEG). The ISO/JPEG DCT compression method is outlined in JPEG Technical Specification, Revision 6, dated Jan. 14, 1991. The inverse of the method utilized in compressor 208 at image processor 24 is implemented via conventional techniques at decompressor 220 of workstation 38.

Image storage system 34 could, for example, consist of an archival system for long term retention of near photographic document images, including background details on the documents from which the images were lifted.

At workstation 38, decompressed pixel data at output 256 of decompressor 220 is presented to threshold table and remapper unit 222. In unit 222, each decompressed pixel is formed as an address to the look-up table which has been downloaded from image store 34 via bus 42 and bus 42a. The thresholded pixel value will then be the contents read from the look-up table at the address specified by the decompressed pixel. The thresholded pixel value is then presented to selector unit 224 via bus 258. The workstation operator may select for viewing either a thresholded pixel version of the document image or the original document image as maintained in archival storage. This selection is effected via signals on control input 260 to selector 224. The selected image data is then passed via selector output 262 to an appropriate display buffer for use by a display element of workstation 38. It will be appreciated by those of ordinary skill in the imaging art, that the image data being prepared for display, be it in thresholded or original decompressed pixel format, could be buffered at alternative positions in the workstation apparatus. Hence, selector 224 could pass data a pixel at a time to a display buffer at its output or, alternatively, the display data could be buffered at a point prior to the input to selector 224 such that an entire document image data set could be passed by selector 224 for appropriate display at the workstation 38. Additionally, as mentioned previously, more than one remapping table could be utilized, depending upon a specific application.

Figure 3:
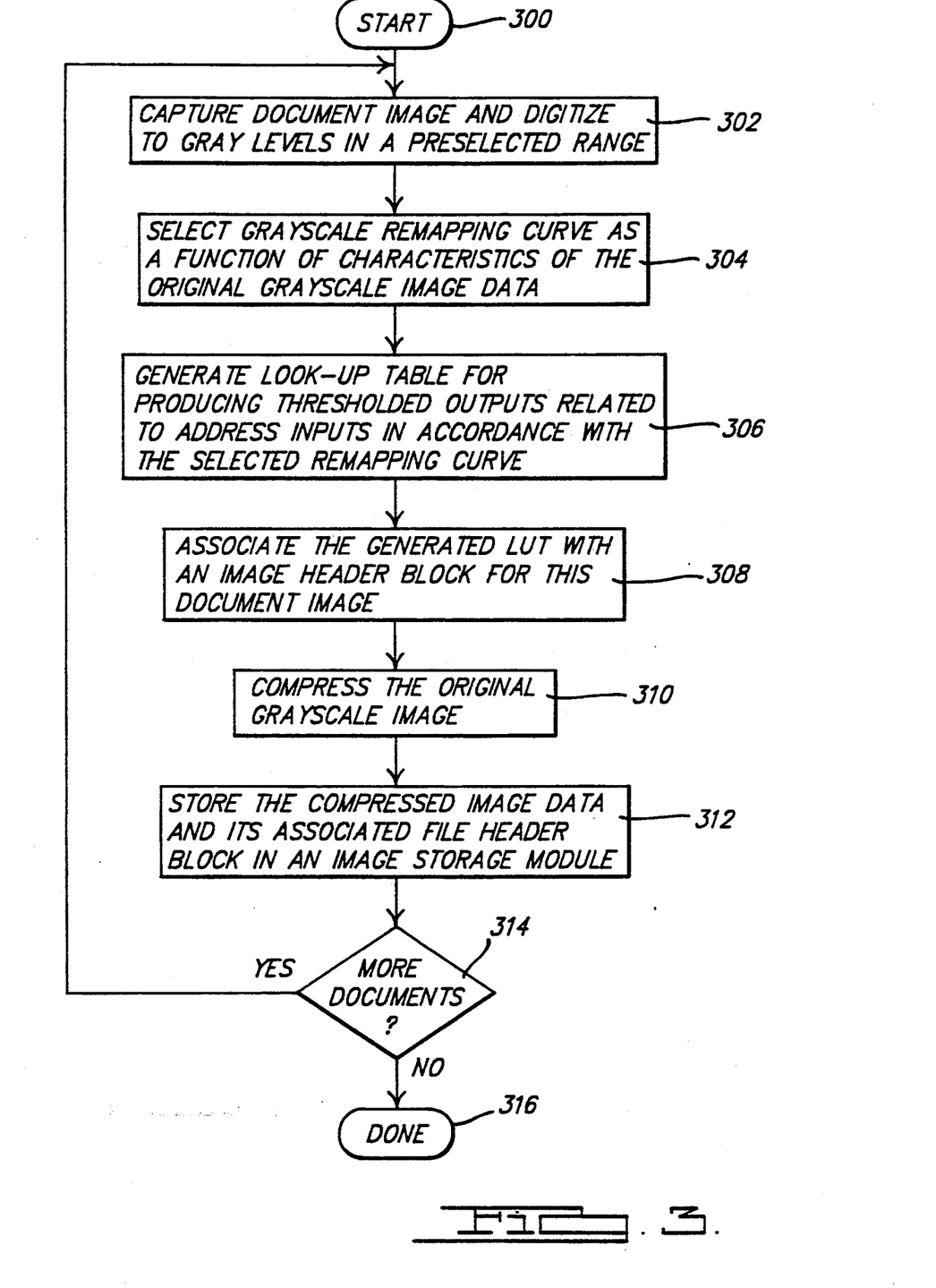
FIG. 3 is a flow chart outlining a portion of an embodiment of a method which can incorporate the method of the invention at the image processor.
Figure 4:
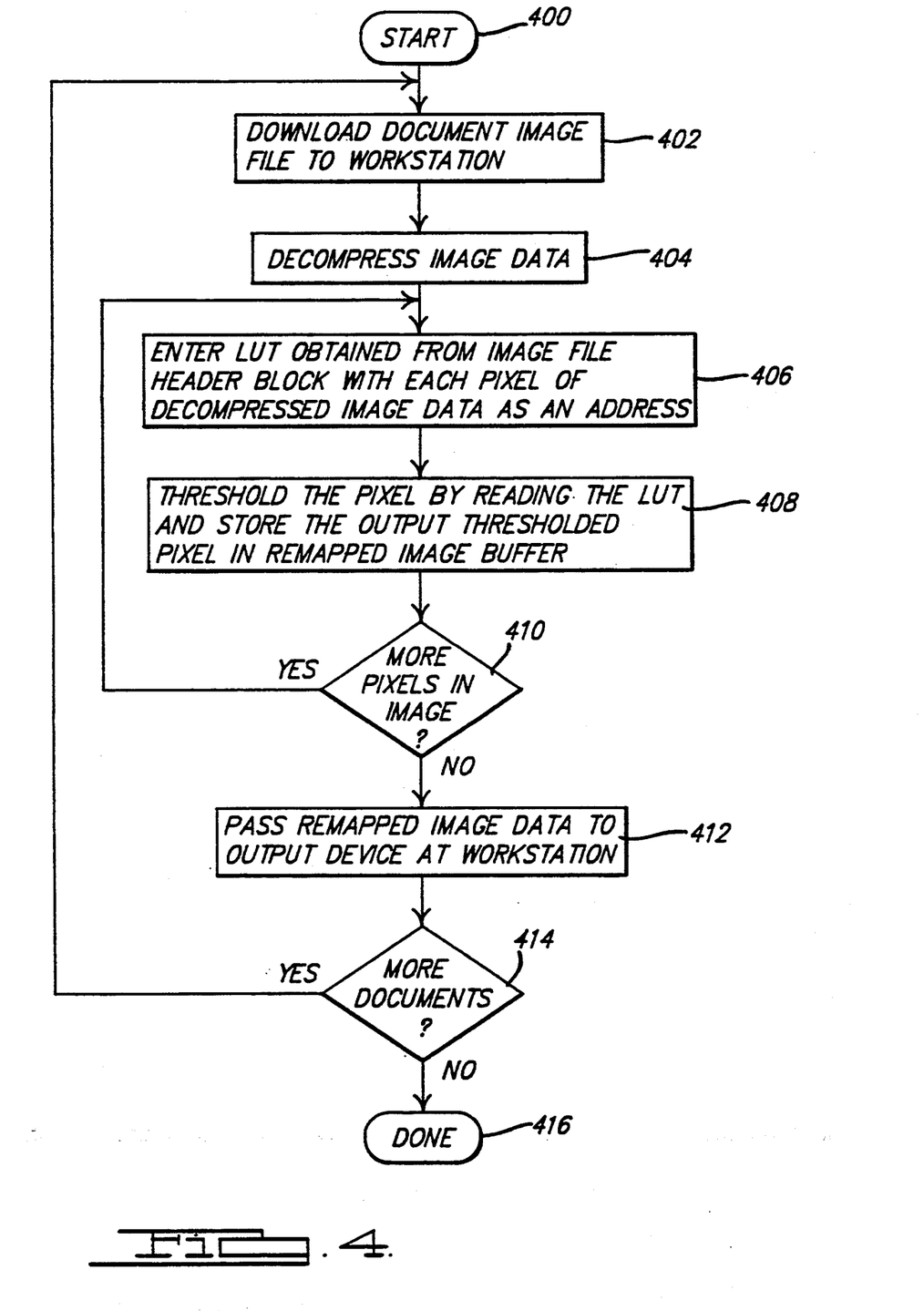
FIG. 4 is a flow chart outlining a portion of an embodiment of a method which can incorporate the method of the invention at a workstation associated with the image processing system.

The steps of this embodiment of a method which can use a remapping table generated by the invention are set forth in the flow charts of FIGS. 3 and 4.

With reference to FIG. 3, the method steps performed at image processor 24 of FIG. 2 are set forth. The routine starts at step 300 and proceeds to step 302 wherein the document image is captured and digitized to gray levels in a preselected range. After image capture and digitalization, the routine proceeds to step 304 wherein a gray scale remapping curve or function is selected as a function of characteristics of the original gray scale image data.

Next, at step 306, the contents of a look-up table are generated for producing outputs related to address inputs in accordance with the selected remapping curve or function. Next, step 308 associates the generated look-up table with an image header block for the document being processed by image processor 24 of FIGS. 1 or 2.

After the look-up table has been generated, step 310 is entered wherein the original grayscale image is compressed for storage with its associated file header block in an image storage module or archival data system as set forth in step 312.

Next, at step 314, if there are more documents to be processed by the sorter of FIG. 1, then the routine returns to step 302 to process the next document. If there are no more documents, then the method steps performed at image processor 24 are completed as indicated at step 316.

FIG. 4 sets forth the steps of a method in a preferred embodiment which can use the method of this invention, which are performed at workstation 38 of FIGS. 1 or 2. The workstation steps start at 400 of FIG. 4 and the routine proceeds to a downloading of the document image file (including the image header block) to the workstation at step 402.

Next, the image data is decompressed with an inverse routine related to the compression method utilized at the image processor. This decompression is shown as step 404.

Next, step 406 enters the look-up table obtained from the image file header block with each pixel of decorepressed image data as an address.

Next, at step 408, the look-up table effectively thresholds the pixel being processed by reading the look-up table at an address specified by the decompressed pixel gray level value. The resulting readout may be stored as a thresholded pixel in a remapped image buffer.

Next, at step 410, the routine checks for the presence of any more pixels in the image being processed. If there are more pixels, the routine returns to step 406. If there are no more pixels in this image, then the remapped image data is output to a display device at the workstation at step 412.

Next, at step 414, if there are more documents to be processed, then the routine returns to step 402. If there are no more documents, then the method steps performed at the workstation are completed as shown at step 416.

The method of FIGS. 3 and 4 allows a full grayscale document image to be transferred into a limited grayscale high-contrast document image suitable for high-speed data entry operations. The generation of the high-contrast, limited grayscale document image is achieved by a simple post-processing operation performed locally at a document image work station. The method eliminates the need to carry two or more document image representations in the image file, since the stored video look-up table can be optionally used to generate an alternate image representation from the original full grayscale picture data. The above method places the computational burden of generating the video look-up table used to threshold the image on the image capture portion of the system at the image processor 24, thereby eliminating or reducing the need for additional image post-processing hardware at the image work station. Use of the method additionally permits real-time, high-speed image threshold post-processing to be performed at an image workstation with minimum computation. If the post-processing threshold hampers document image legibility at the work station, the thresholding process can be easily disabled to provide the data entry operator with a full grayscale, near-photographic image rendition.

In a preferred embodiment of a method for generating the remapping look-up table (LUT), a method for the rapid transformation of 8-bit, near-photographic document images to 2-bit or 4-bit high-contrast, "background suppressed" images is described. This method uses a gray level histogram of the input image to compute a gray level remapping LUT. This LUT is created with the goals of displaying information which is believed to be background as white and of contrast-enhancing the residual signal (i.e. portions of the document image which are necessary for its processing) information.

The method is driven by a gray level histogram of the original (uncompressed) image. All substantial peaks of the histogram in the upper two-thirds (i.e. towards the whitest gray level) of the gray level range are identified. These peaks are usually due to the background of the document. Gray level thresholds derived from the locations of the peaks closest to all white and closest to one-third of all white are used to control the shape of a remapping curve or function. The characteristics of this curve are dependent upon the number of output gray levels available.

For 2-bit output images, the remapping curve is defined as follows:
1. If two thresholds are found:
    a) Input gray levels above the higher threshold are mapped to white (3).
    b) Input gray levels between the two thresholds are mapped to output level 2 (light gray).
    c) Input gray levels below the lower threshold are linearly remapped between 0 (black) and 1 (dark gray).
2. If one threshold is found:
    a) Input gray levels above the higher threshold are mapped to white (3).
    b) Input gray levels below the lower threshold are linearly remapped between 0 (black) and 2 (light gray).

For 4-bit output images, the remapping curve works qualitatively as follows:
1. If two thresholds are found:
    a) Gray levels of the original image greater than the higher threshold are forced to white (15) in the output image.
    b) Gray levels of the original image between the two thresholds are de-emphasized or lightened with a non-linear curve.
    c) Gray levels below the lower threshold are emphasized or darkened with a non-linear curve.
2. If a single threshold is found:
    a) Gray levels of the original image greater than the threshold are forced to white (15) in the output image.
    b) Gray levels below the threshold are emphasized or darkened with a non-linear curve.

These rules for LUT specification were derived from the following considerations. Setting gray levels above the higher threshold to all white has the effect of removing background from the output image. Information between the two thresholds (if two peaks in the histogram are found) is retained, but de-emphasized. This is because such information is usually background and the second threshold is usually caused by a scenic or patterned background. Since signal information sometimes lies in this gray level range between the two thresholds, it is important that such information not be completely eliminated from the output image. Finally, since information below the lower threshold is almost always signal, it must be retained (and enhanced when possible) in the output image.

The method of the preferred embodiment operates on 64 entry gray level histograms. This is principally because histogram resolution beyond that afforded by a 64 entry histogram has been found unnecessary. In addition, histogram smoothing or filtering, which is described in a later section of this specification, can be accomplished with a reasonably sized filter kernel if a 64 entry histogram is used. When a histogram with more than 64 entries is input to the table generating method of the invention, the input histogram, $H_{in}$, is first reduced to 64 entries by summing contiguous histogram bin amounts. The equation which relates the input histogram $H_{in}$ to the output 64 entry histogram $H_{out}$ is $$H_{out}[g] = \sum_{n=0}^{\frac{N}{64} - 1} H_{in}\left[ \frac{N}{64} g + n \right]$$

Where $g = 0, 1 \ldots 63$ and $N =$ number of entries in the original, or input histogram $H_{in}$. For example, if $N=128$, then the output histogram entries are found by pairing adjacent input histogram entries—i.e. $H_{OUT}(0) = H_{in}(0) + H_{in}(1)$, etc.

To lower-bound the amount of histogram inflection which is considered to represent a peak, and to reduce the effects of noise, the 64 entry histogram is next smoothed with a low pass, finite impulse response filter. Very small peaks and rapid excursions in the histogram are removed by such a filter. In the preferred embodiment, the filter is a simple 5-element averager and is chosen to allow implementation without the need for any multipliers. The impulse response of this filter is

| n | h(n) |
|---|---|
| −2 | 1 |
| −1 | 1 |
| 0 | 1 |
| 1 | 1 |
| 2 | 1 |

Thus, to obtain a smooth histogram point, one would take the original histogram point (at n=0) and average it with the two contiguous points to its right and left (i.e. n=−2 to n=+2).

Next, to locate relevant peaks of the smoothed histogram, the discrete equivalent of the first derivative of the histogram waveform is generated. This is accomplished using a first-order difference function, d(n), of the smoothed histogram which is generated according to $$d[n]=H[n+1]-H[n]$$

Since d[n] is the discrete equivalent of the first derivative, it has zeros where the undifferenced histogram function has extrema. This characteristic is used to locate the peaks of the smoothed histogram.

Since the first-order difference of the histogram is sampled discretely, it is probable that it will contain no zeros. Therefore, the locations of the zeros of the difference function are estimated by testing for and locating zero crossings of that difference function. The zero-crossing location problem can be reduced to a binary pattern-matching test through use of the SIGN function. The SIGN function is defined as follows:

$$SIGN(x) = \begin{cases} 1 \text{ for } x \geq 0 \\ 0 \text{ for } x < 0 \end{cases}$$

Starting at the white (level 63) end of the histogram and moving towards black (level 0), peaks of interest in the histogram will always be approached through regions of negative slope. This means the difference function will be negative in those regions and will transition to positive values at, or just beyond, the peak of the histogram. To reject broad flattenings of the histogram as well as residual noise, the difference function is required to have a number of negative samples adjacent to a number of zero or positive samples to constitute a valid zero crossing.

Using the SIGN function, detection of appropriate zero-crossings of the difference function can be reduced to bit-wise logical operations. In particular, a detection window can be defined as a pattern of contiguous zeros adjacent to a pattern of contiguous ones. Zero-crossing detection then becomes a process of sliding the detection window along the SIGN function bit pattern, performing an exclusive-OR at each pattern bit position, and counting the number of ones that result. These ones represent mismatches between the detection window and the SIGN function. The number of ones must be below a specified threshold in order for the result to be considered a valid match. The details of detection window size and the number of bits of the SIGN function which must match the window are preselected parameters of the method of the invention. Empirically, the best test results have been attained with a method using a detection window of size or bit width 7 with the binary values 1110000, and a match threshold of 6. Thus, in the preferred embodiment, a difference function zero-crossing is said to occur at points on the SIGN function which match six of the seven bits of the detection window bit pattern.

Each detected zero-crossing is subjected to an additional test before being considered valid. The peak of the histogram which corresponds to a given zero-crossing must be at least one-eighth as big as the largest peak found. This eliminates from consideration thresholds derived from small but well defined peaks.

Generally, a histogram peak represents the statistical mode of some portion of the document background. Where, as in the present embodiment, the blackest gray level is all zeros and the whitest gray level is all ones, it is desirable to select thresholds somewhat to the left (i.e. darker or toward black) of this point so that much of the background can be de-emphasized or clipped to white. One can obtain additional information about a particular peak by examining the histogram difference function. As the difference function is traversed left of a zero-crossing, the difference function will reach a positive maximum (corresponding to the maximum slope of the histogram) and then decrease as the detection window moves away from an isolated peak. Setting the gray level threshold at the point at which the difference function falls to one-half its maximum value left or to the dark side of a particular zero-crossing has been found to yield good empirical results.

One or two gray level thresholds are determined using the techniques described above and subject to the following additional constraints:

1. Only thresholds in the upper two-thirds of the gray level range of the original document data are considered valid.
2. If no zero-crossings are found in the valid range, a single threshold is set to two-thirds of the whitest gray level in the original document range.

A high threshold, THRHI, is that threshold closest to the whitest gray level, while a low threshold, THRLO, corresponds to the other peak closest to one-third of white—i.e. the highest value gray level. If only one peak is found, then THRHI equals THRLO.

The effects of histogram resolution/reduction, if any, are reversed by multiplying the thresholds by the reduction factor which is simply the entry size of the original histogram divided by 64. The output LUT values are next defined. The LUT values depend upon the number of output gray levels desired and the number of thresholds which were located. For two-bit converted images with two distinct thresholds located, the LUT contents are defined as follows:

(4a) $LUT(i)=00$ for $i=0,1,\ldots,\lfloor THRLO/2 \rfloor$
(4b) $LUT(i)=01$ for $i=\lfloor THRLO/2 \rfloor+1,\ldots, THRLO$
(4c) $LUT(i)=10$ for $i=THRLO+1,\ldots, THRHI$
(4d) $LUT(i)=11$ for $i=THRHI+1,\ldots$, highest original gray level $\lfloor x \rfloor$ represents a floor operator which rounds x down to the nearest integer value.

For two-bit images where only one threshold, THR, has been determined, the LUT contents are defined by:

(5a) $LUT(i)=00$ for $i=0,1,\ldots,\lfloor THR/3 \rfloor$
(5b) $LUT(i)=01$ for $i=\lfloor THR/3 \rfloor+1,\ldots, 2*\lfloor THR/3 \rfloor$
(5c) $LUT(i)=10$ for $i=2*\lfloor THR/3 \rfloor+1,\ldots, THR$
(5d) $LUT(i)=11$ for $i=THR+1,\ldots$, highest original gray level For four-bit images, which may be useful for returned item FAX, limited-gray scale hard copy or other applications, the following equations define the contents of the LUT:

$$LUT(i) = \text{ROUND}\left\{ \frac{14\, THRLO}{THRHI} \left[ \tanh\left( \frac{2.1i}{THRLO} - 2.1 \right) + 1 \right] \right\} \quad (6a)$$

for $i = 0, 1, \ldots THRLO$ $$LUT(i) = \text{ROUND}\left\{ \frac{14\,(THRHI - THRLO)}{THRHI} \tanh\left[ \frac{2.5(i - THRLO)}{THRHI - THRLO} \right] + \frac{14\,THRLO}{THRHI} \right\} \quad (6b)$$

for $i = THRLO + 1, THRHI$ $LUT(i) = 1111$, for $i = THRHI + 1, \ldots,$ highest orginal gray level (6c)

ROUND is a true rounding function which rounds up to the next highest integer for fractions of 0.5 or higher and down to the next lowest integer, otherwise. It should be noted that if there is only one threshold found, THRHI is set equal to THRLO and Equation 6b never becomes effective. The constants 2.1 and 2.5 were empirically derived and control the curvature of the non-linear emphasis and de-emphasis functions. The emphasis portion (below THRLO) is made less curved than the de-emphasis portion (between THRLO and THRHI) to prevent the extreme darkening of high contrast scenes on scenic documents such as personal checks.

Figure 5:
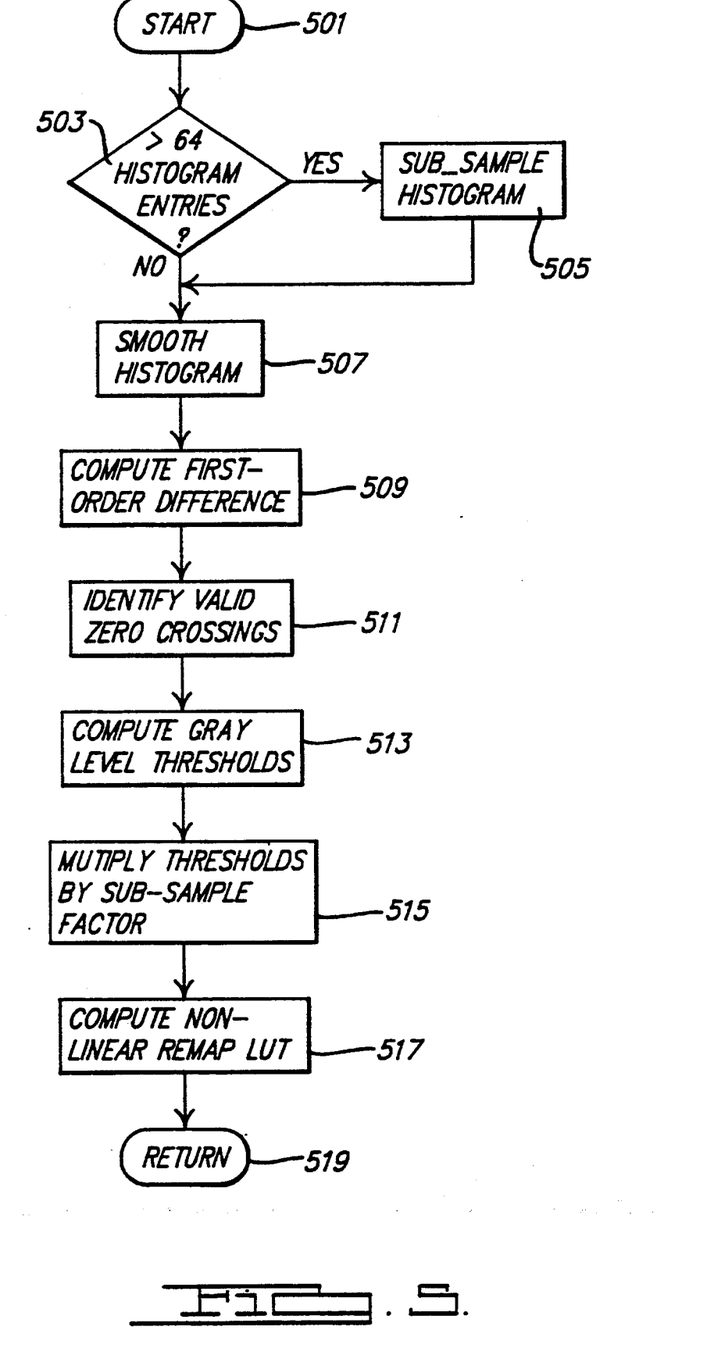
FIG. 5 is a flow chart outlining the major steps of a method for generating the contents of a remapping look-up table arranged in accordance with the principles of the invention.

Implementation of the above approach to generating a remapping look-up table may be best summarized with reference to the flow chart of FIG. 5 and the software coding set forth in Appendices 1 through 9.

The program flow of the method of the invention set forth in FIG. 5 is, in effect, an expanded detail of steps 304 and 306 of FIG. 3 wherein a suitable remapping look-up table is to be generated in accordance with a remapping curve whose characteristics are a function of the histogram of the document image data to be remapped.

The computer code for implementing steps 503 through 517 of FIG. 5 are set forth in a C-coded program version in Appendix 1, which basically comprises a series of subroutine calls. The C-code for the various subroutines is set forth in Appendices 2 through 9.

The routine of FIG. 5 is entered at the start step 501. Next, the size, or number of entry categories or bins, of the histogram for the document of interest is determined and if it is greater than 64, as determined by the C-code at line 2 of Appendix 1, then the histogram is subsampled at step 505 in accordance with the code set forth in Appendix 2.

Next, the histogram is filtered or smoothed at step 507 utilizing the code set forth in Appendix 3.

After smoothing, the first order difference function of the histogram is computed at step 509 which is implemented by the code set forth in Appendix 4.

Next, valid zero-crossings are searched and identified at step 511 utilizing code set forth in Appendices 5, 6 and 7. After the zero-crossings are identified, the appropriate gray level thresholds THRLO and THRHI are determined using the code set forth in Appendix 5 and Appendix 8. This is shown as step 513 of FIG. 5. Then, at step 515, the thresholds are adjusted, if the original histogram contained more than 64 entries. This step is implemented at Appendix 1, line 6.

Finally, the contents of the look-up table are generated using the code set forth in Appendix 9 and shown as step 517 of FIG. 5. Basically, the code of Appendix 9 implements the various equations (4a) through (4d), (5a) through (5d), and (6a) through (6c) set forth above.

The original, near photographic image data can then be remapped at the workstation as set forth in the flow charts of FIG. 4 by entering the look-up table with an address determined by an original pixel gray level value and taking the look-up table contents at that address as the remapped pixel value.

Figure 6:
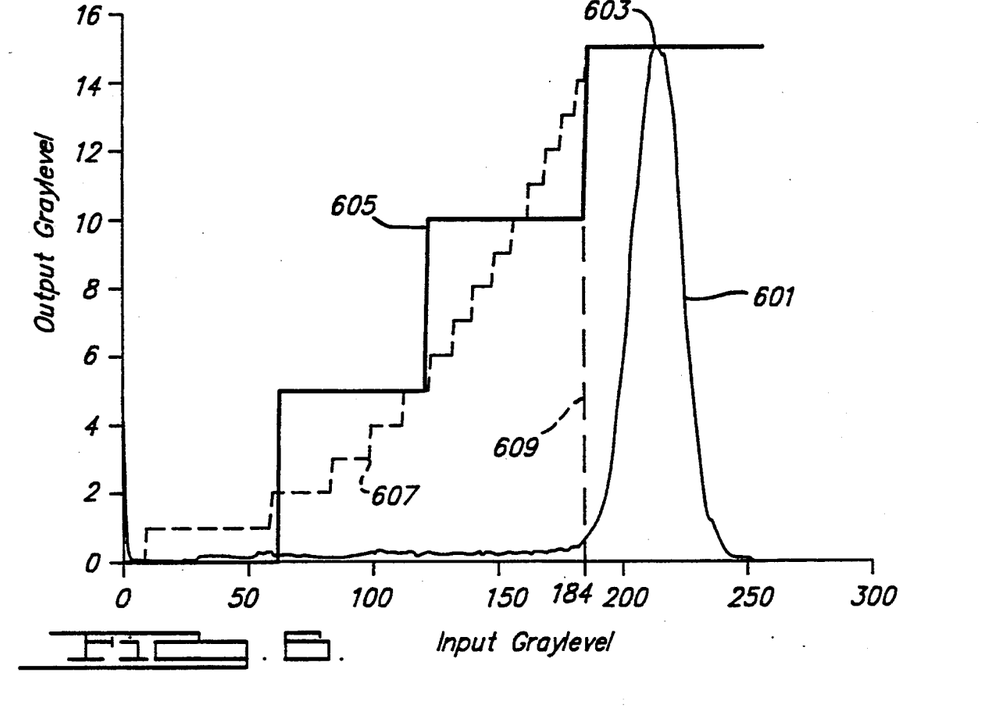
FIG. 6 is a graph setting forth a typical pixel histogram along with two alternative remapping curves generated for the situation where a single threshold has been identified in the original pixel data histogram.
Figure 7:
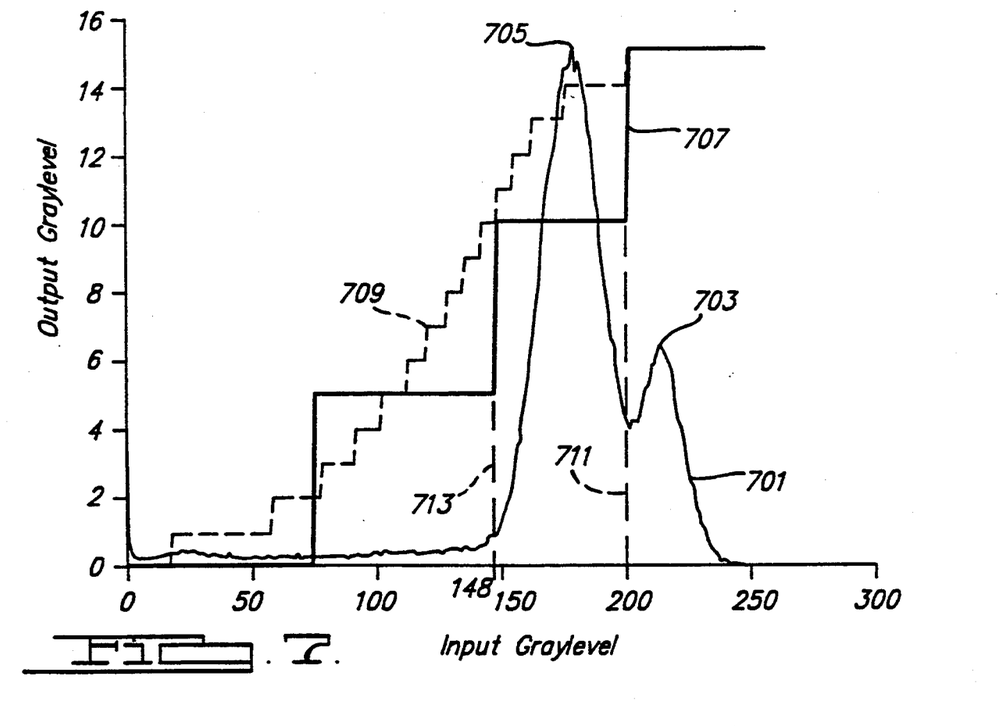
FIG. 7 is a graph setting forth examples similar to those in FIG. 6, with the exception that two thresholds have been identified in the histogram data.

FIG. 6 shows sample 2-bit and 4-bit remapping curves for a single threshold of gray level 184. FIG. 7 shows sample 2-bit and 4-bit remapping curves for THRLO=148 and THRLO=200. It should be noted that the 2-bit LUT values for both FIGS. 6 and 7 are multiplied by 5 to fit on the same scale as the 4-bit LUT remapping curve. Additionally, the original 8-bit histograms of the original document images which were remapped are shown for reference in FIGS. 6 and 7.

With reference to FIG. 6, the original histogram is designated 601 and its peak at 603. The single threshold identified is labeled 609 and results in the 2-bit remapping curve 605 and the 4-bit remapping curve 607.

With reference to FIG. 7, the original document's histogram is designated 701 and is shown to have peaks located at 703 and 705, which result in the thresholds 711 and 713, respectively. Finally, the 2-bit remapping curve is designated 707, while the 4-bit remapping curve is designated 709.

The invention has been described with reference to a preferred embodiment, the details of which are presented solely for the sake of example. The scope and spirit of the invention are to be determined by the appropriately interpreted appended claims.

APPENDIX 1

```
    /*    Main    */
1.  hist_reduction_factor = num_input_grays/64;
2.  if(hist_reduction_factor >1)
        reduce_hist (input_hist, num_input_grays,hist_reduction_factor);
3.  smooth_hist(input_hist);              /*Apply 5-element average FIR filter*/
4.  diff_hist (input_hist, diff_func);    /*Place 1st-order difference function
                                              of input_hist in diff_func */
5.  get_thresh (input_hist, diff_func, thr1,thr2);  /*Compute thresholds */
6.  if (hist_reduction_factor >1)}
        thr1 = thr1 * hist_reduction_factor;
        thr2 = thr2 * hist_reduction_factor;
    }
7.  make_lut (out_LUT,num_input_grays, num_output_grays, thr1, thr2);
```

APPENDIX 2

```
/*      reduce_hist    */
void reduce_hist (input_hist,
num_input_grays, hist_reduction_factor)
for (i=0;i<(num_input_grays/hist_reduction_factor−1); i++){
    count = input_hist[i*hist_reduction_factor];
    for (j=1; j=hist_reduction_factor−1; j++)
        count = count + input_hist[i*hist_reduction_factor+j];
    hist[i] = count;
}
```

APPENDIX 3

```
/*     smooth_hist    */
void smooth_hist(input_hist)
    /*    handle endpoints    */
output_hist[0]  = (input_hist[0]+input_hist[1]+input_hist[2])>>2;
output_hist[1]  = (input_hist[0]+input_hist[1]+input_hist[2]+input_hist[3])>>2;
output_hist[62] = (input_hist[60]+input_hist[61]+input_hist[62]+input_hist[63])>>2;
output_hist[1]  = (input_hist[61]+input_hist[62]+input_hist[63])>>2;
/*    smooth other entries    */
for (i=2; i<62; i++) {
    sum = 0;
    for (j=i−2; j<=i+2; j++)
        sum = sum + input_hist[j];
    output_hist[i] = sum>>2;
}
input_hist = output_hist;
```

APPENDIX 4

```
/*     diff_hist    */
void diff_hist (input_hist, diff_func)
for (i=0; i<63; i++)
    diff_func[i] = input_hist[i+1] - input_hist[i];
diff_func[63] = -input_hist[63];  /*In effect, input_hist[64] = 0 */
```

APPENDIX 5

```
/*     get_thresh    */
void get_thresh (input_hist, diff_func, thr1, thr2)
    get_sign (diff_func, sign_func);     /*Place the sign function of
                                             diff_func in sign_func */
    get_zerocs (input_hist, sign_func, zerocs, numzcs);
                                         /*Place all valid zero-crossing
                                             indices in zerocs[] */
    calc_thresholds (diff_func, zerocs, numzcs, thr1, thr2);
                                         /*Place threshold indices in
                                             variables thr1 and thr2 */
```

APPENDIX 6

```
/*     get_sign    */
void get_sign (diff_func, sign_func)
for (i=0;<64; i++)
    if (diff_func[i] > =0)
        sign_func[i]=1;
    else
        sign_func[i] = 0;
sign_func[64] = 0;   /* These statements allow very bright
                         peaks to be found as zero-crossings  */
sign_func[65] = 0;
```

APPENDIX 7

```
/*     get_zerocs    */
void get_zerocs (input_hist, sign_func, thr1, thr2)
detect_mask = 0X70;        /* Binary 1110000 */
hist_max = 0;              /* Used to eliminate small peaks */
mismatch_thresh = 1;       /* We require at least 6 of 7 bit match */
numzcs = 0;                /* Initialize number of zero-crossings found */
for (i=65;i>=7;i−−) {      /*Move from white to black */
    input_pattern = 0;
    for (m=6; m>0; m−−) {  /* Get 7-bit sign pattern */
        input_pattern = input_pattern |sign_func[i−m];
                           /* OR the left-most remaining bit */
        input_pattern = input_pattern <<1;
                           /* Shift the pattern to make room for next bit */
    }
    input_pattern = input_pattern |sign [1];
                           /* Get the right-most bit */
    match_result = input pattern ^ detect_mask;
                           /* XOR input pattern with detection mask
                              Any unmatching bits will be 1 in match_result */
    mismatch_num=0
    for (m=0; m<7; m++) {
        if (match_RESULT & 1)    /* If LSB is a mismatch, count it */
            mismatch_num++;
        match_result = match_result>>1;
    }                              /*Look at next bit */
    if (mismatch_num <= mismatch_thresh) {
        zerocs[numzcs] = i − 3;    /* Zero-crossing index is last negative
                                       diff-func value */
        if (input_hist[i−3] > hist_max)   /* Update maximum if necessary */
            hist_max = input hist[i−3];
        numzcs++;
    }
}          /*    End zero-crossing detection FOR loop */
/*    Mark indices which correspond to peaks smaller than ⅛ the largest peak */
hist_thresh = hist_max>>3;
for (i=0; i<numzcs; i++) {
```

APPENDIX 7-continued

```
            if (input_hist[zerocs[i]] < hist_thresh) }   /* Peak is too small */
                numzcs--;
                zerocs[i] = -1;                         /* Mark location for later removal */
            }
    }
        /* Now remove indices which correspond to small peaks. We want the array
           zerocs[] to be in sorted decreasing order. */
    for (i=0; i<numzcs; i++) {
        m=i;
        while (zerocs[m] == -1)                         /* Remove -1's from zerocs[] */
        m++;
        zerocs[i] = zerocs[m];
        if (m != i)
            zerocs[m] = 1;                              /* Replace current value with -1 to avoid
using it again */
    }
```

APPENDIX 8

```
/*      calc_thresholds     */
void calc_thresholds (diff_func, zerocs, numzcs, thr1, thr2)
zc=0;                              /* Zero-crossing counter */
t=0;                               /* Threshold counter */
while (zc < numzcs) {              /* Get a threshold for each zero-crossing
                                      of diff_func */
        /*  Next while statement eliminates contiguous zero-crossings
            which result from multiple detections of the same peak */
    while (zerocs[zc+1] == zerocs[zc] - 1)
        zc++;
    i = zerocs[zc];                /* Start at 0 or positive value of diff_func */
    while (diff_func[i] < 0)
    i--;
    max = diff_func[i];            /* Find local-maximum of difference function left
                                      of the zero-crossing */
    while (diff[i-1] >= diff[i]) {
        max = diff[i-1];
        i--;
    }
    while (diff[i]>max/2)          /* Continue left until ½ of max is reached */
    i--;
    thresh[t] = i;                 /* ½ max point is the threshold */
    t++;                           /* Increment threshold counter */
}                                  /* Finished processing all zero-crossings */
thr2 = thresh[0];                  /* Highest threshold is thr2 */
if (thr2 < 21) {                   /* Require thresholds to be in upper ⅔
    thr2 = 42;                        of grayscale range */
    thr1 = 42;
    return;
}
i = t-1;                           /* Start from darkest of thresholds to */
while ((thresh[i]<21)&&(i>0))      /* find thr1. It must be in upper ⅔ as well. */
    i--;
thr1 = thresh[i];
```

APPENDIX 9

```
/*      make_lut    */
make_lut (out_LUT, num_input_grays, num_output_grays, thr1, thr2)
    if (num_output_grays == 4) {   /* Use 2-bit LUT rules */
        if (thr1 == thr2) {        /* There's only one threshold */
            t01 = thr½;            /* Linearly remap */
            t12 = t01<<1;
        }
        else {                     /* There are two thresholds */
            t01 = thr1 >>1;
            t12 = thr1;
        }
        for (i=0; i<=t01; i++)     /* Do Equations 4 and 5 */
            out_LUT[i] = 0;
        for (i=t01 + 1; i<= t12; i++)
            out_LUT[i] = 1;
        for (i=t12+1; i<= thr2; i++)
            out_LUT[i] = 2;
        for (i=thr2+1; i<num_input_grays; i++)
            out_LUT[i] = 3;
    }
    else {                         /* 4-bit LUT rules (works for other output
        /* Do Equations 6 */
        low_fac = (num_output_grays-2)*(thr1/thr2);
        low_slope = 2.1/thr1;
```

APPENDIX 9-continued

```
for (i=0; i< = thr1; i++)
    out_LUT[i] = (int)(low_fac*(tanh(low_slope*i−2.1)+1)+0.5);
high_fac = (num_output_grays−2)*(thr2−thr1)/thr2;
high_slope = 2.5/(thr2−thr1);
high_intercept = (num_output_grays−2)*thr1/thr2;
for (i=thr1+1; i< = thr2; i++)
    out_LUT[i] = (int)(high_fac*tanh(high_slope*(i−thr1))
                + high_intercept + 0.5);
for (i=thr2+1; i<num_input_grays; i++)
    out_LUT[i] = num_output_grays −1;
```

What is claimed is:

1. In an image processing system, a method of adjusting gray level tone scale of document image data generated by the image processing system for subsequent display, the method comprising:

reading the image data and generating a tone scale adjusting function based on said image data:

constructing and storing a document image data file comprising said document image data and said tone scale adjusting function;

subsequently accessing said document image data file to retrieve said document image data and said tone scale adjusting function;

subsequently utilizing the retrieved adjusting function to alter the retrieved image data to generate tone scale-adjusted image data prior to display thereof;

identifying a preselected gray level range in which at least one histogram peak is identified, said peak comprising a range of levels between about one-third of a whitest level and the whitest level of the original document gray level range; and identifying first and second histogram peaks, the first peak being closest to the whitest level and the second peak being closest to one-third of the whitest level, wherein all original gray level data points whiter than a first threshold level determined by the first histogram peak are adjusted to a whitest gray level and wherein all original gray level data points lying between the first threshold and a second threshold determined by the second histogram peak are de-emphasized, and wherein all original gray level data points darker than the second threshold are enhanced.

2. In an image processing system, a method of adjusting gray level tone scale of document image data generated by the image processing system for subsequent display, the method comprising:

reading the image data and generating a tone scale adjusting function based on said image data:

constructing and storing a document image data file comprising said document image data and said tone scale adjusting function;

subsequently accessing said document image data file to retrieve said document image data and said tone scale adjusting function;

subsequently utilizing the retrieved adjusting function to alter the retrieved image data to generate tone scale-adjusted image data prior to display thereof; and the preselected adjusting function comprises a remapping function for use in converting document image original pixel gray level data lying in a first range of gray level values to higher contrast and background-suppressed pixel gray level data lying in a second range of gray level values, and wherein the remapping function is generated by (a) generating a gray level histogram of all pixels of a document;

(b) identifying and saving two histogram peaks, a first peak closest to the whitest gray level of the first range and a second peak closest to one-third the whitest gray level of the first range, if any;

(c) whenever no peaks are identified, setting a high threshold and a low threshold, both equal to about two-thirds of the whitest gray level value in the first range and proceeding to step (f);

(d) whenever a single peak is identified, setting a high threshold and a low threshold both equal to a gray level value in the first range which is darker, by a preselected amount, than a gray level value in the first range corresponding to the single histogram peak and proceeding to step (f);

(e) setting a high threshold to a gray level value in the first range and darker, by a preselected amount, than a gray level value corresponding to the first peak, and setting a low threshold to a gray level value in the first range and darker, by a preselected amount, than a gray level value corresponding to the second of the two peaks; and (f) defining the remapping function as
  (i) converting all pixels in the first range having gray level values greater than the high threshold to a whitest gray level value in the second range,
  (ii) converting all pixels in the first range having gray level values between the high and low thresholds to de-emphasized gray level values in the second range, and
  (iii) converting all pixels in the first range having gray level values less than the low threshold to emphasized gray level values in the second range.

3. The method of claim 2, further comprising the step of filtering the histogram so as to smooth out small peaks and noise therein prior to identifying and saving histogram peaks.

4. The method of claim 2, wherein step (b) further comprises generating a first-order difference function of the histogram and identifying histogram peaks by estimating locations of zero-crossings of the first-order difference function.

5. The method of claim 4, wherein zero crossing locations are estimated using a binary pattern matching test comprising the steps of:

calculating a SIGN function of the first-order difference function where $$\text{SIGN}(x) = \begin{array}{l} 1 \text{ for } x \geq 0 \\ 0 \text{ for } x < 0 \end{array};$$

defining a detection window as a pattern of a first preselected number of contiguous binary zeros adjacent a second preselected number of contiguous binary ones;

sliding the detection window along the calculated SIGN function bit pattern and at each window position counting mismatches between the detection window bit pattern and the SIGN function; and designating a valid zero crossing whenever the count of the mismatches is below a predetermined threshold.

6. The method of claim 4, wherein the preselected amount of steps (d) and (e) is approximately equal to a gray level value in the first range corresponding to a point at which the first-order difference function falls to half its maximum value on a darker side of a zero-crossing of interest.

7. The method of claim 2, wherein only thresholds in an upper two-thirds of the first range are considered valid.

8. The method of claim 2, wherein step (f) (ii) further comprises non-linearly de-emphasizing gray scale values between the high and low threshold values.

9. The method of claim 8, wherein non-linear de-emphasis is effected via a hyperbolic tangent function of the high and low threshold values.

10. The method of claim 2, wherein step (f) (iii) further comprises non-linearly emphasizing gray level values less than the low threshold value.

11. The method of claim 10, wherein non-linear emphasis is effected via a hyperbolic tangent function of the low threshold value.

12. The method of claim 2, wherein the remapping function is implemented by a look-up table whose contents contain gray level values in the second range addressed in accordance with an original pixel gray value in the first range.

13. In an image processing system, a method of adjusting gray level tone scale of document image data generated by the image processing system for subsequent display, the method comprising:

reading the image data and generating a tone scale adjusting function based on said image data:

constructing and storing a document image data file comprising said document image data and said tone scale adjusting function;

subsequently accessing said document image data file to retrieve said document image data and said tone scale adjusting function;

subsequently utilizing the retrieved adjusting function to alter the retrieved image data to generate tone scale-adjusted image data prior to display thereof; and generating contents of a remapping look-up table for use in converting original near-photographic document image pixel gray levels lying in a first range of gray level values to higher contrast and background-suppressed limited pixel gray level data lying in a second range of gray level values smaller than the first range, the conversion performed by reading the look-up table at an address determined by a gray level value of an original pixel of interest and reading out a converted value, by:

(a) generating a gray level histogram of all pixels of a document;

(b) suppressing small peaks and noise in the histogram by use of a smoothing filter;

(c) generating a first-order difference function of the histogram and identifying two histogram peaks, if any, by estimating locations of zero-crossings of the first-order difference function and saving two peaks, a first peak closest to the whitest gray level of the first range and a second peak closest to one-third the whitest gray level of the first range;

(d) whenever no peaks are identified, setting a high threshold and a low threshold both equal to about two-thirds of a whitest gray level value in the first range and proceeding to step (g);

(e) whenever a single peak is identified, setting a high threshold and a low threshold both equal to a gray level value in the first range which corresponds to a gray level value at which the first-order difference function falls to half its maximum value on a darker side of the single peak and proceeding to step (g);

(f) setting a high threshold to a gray level value in the first range which corresponds to a gray level at which the first-order difference function falls to half its maximum value on a darker side of the first saved peak, and setting a low threshold to a gray level value in the first range which corresponds to a gray level at which the first-order difference function falls to half its maximum value on a darker side of the second saved peak; and (g) defining the contents of the remapping table by
(i) placing a whitest gray level value of the second range at all table addresses specified by original pixel values above the high threshold,
(ii) placing de-emphasized gray level values in the second range at all table addresses specified by original pixel values between the high and low thresholds, and
(iii) placing emphasized gray level values in the second range at all table addresses specified by original pixel values below the low threshold.

14. The method of claim 13, wherein only thresholds in an upper two-thirds of the first range are considered valid.

15. The method of claim 14, wherein step (g)(ii) further comprises non-linearly de-emphasizing gray level values in the second range.

16. The method of claim 15, wherein step (g)(iii) further comprises non-linearly emphasizing gray level values in the second range.

17. The method of claim 16, wherein non-linear de-emphasis is effected via a hyperbolic tangent function of the high and low thresholds and wherein non-linear emphasis is effected via a hyperbolic tangent function of the low threshold.

18. The method of claim 13, wherein the locations of the zero crossing in step (c) are estimated using a binary pattern matching test comprising the steps of:

calculating a SIGN function of the first-order difference function where $$\text{SIGN}(x) = \begin{cases} 1 \text{ for } x \geq 0 \\ 0 \text{ for } x < 0 \end{cases};$$

defining a detection window as a pattern of a first preselected number of contiguous binary zeros adjacent a second preselected number of contiguous binary ones;

sliding the detection window along the calculated SIGN function bit pattern and at each window position counting mismatches by exclusive-ORing the window pattern to the SIGN pattern; and designating a valid zero crossing whenever the count of mismatches is below a predetermined threshold.

* * * * *